Oct. 4, 1955 W. W. PRICKETT ET AL 2,719,480
DEEP FRIER
Filed Nov. 4, 1952 2 Sheets-Sheet 1
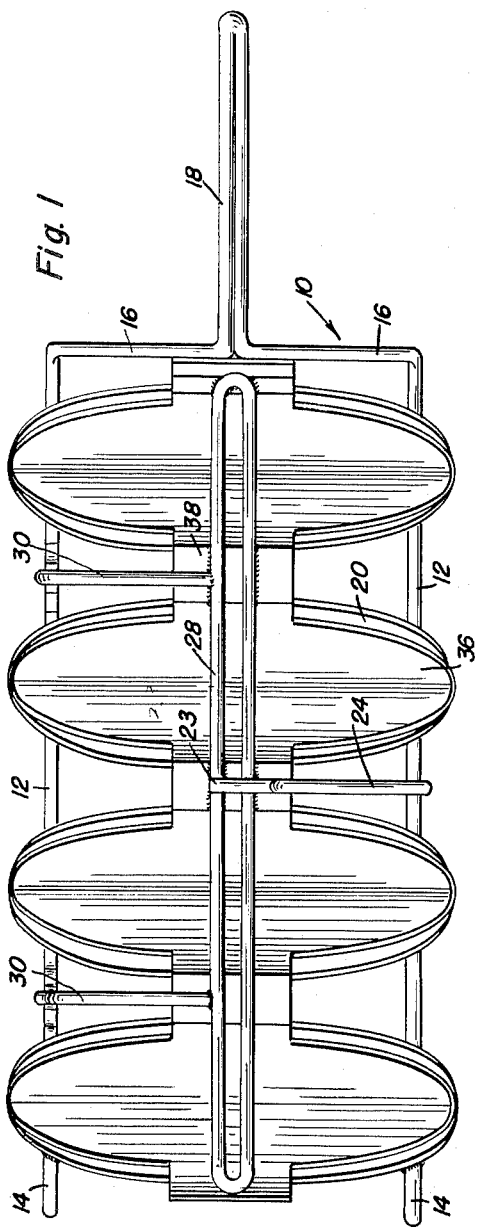
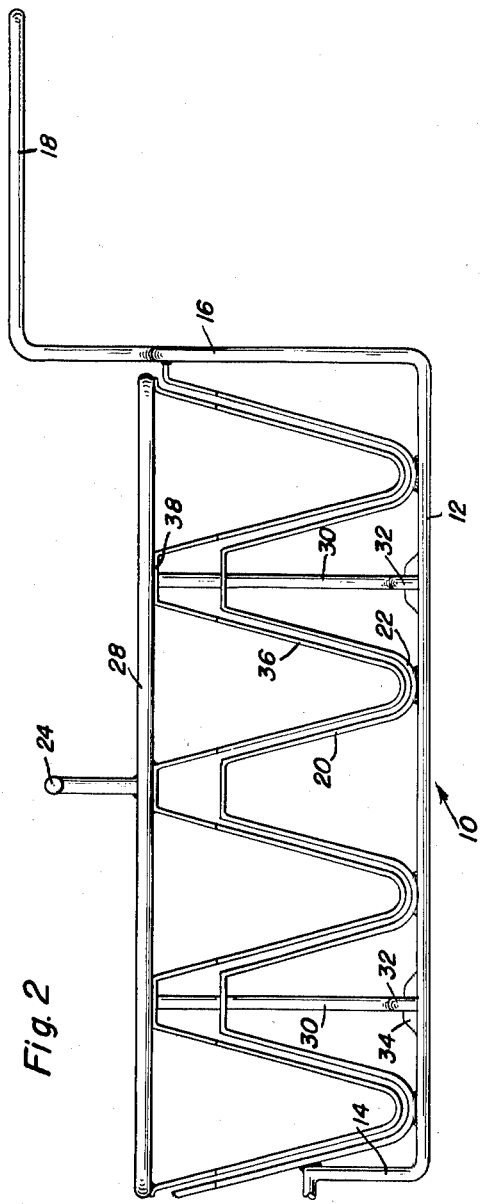
Wilber W. Prickett
Mona E. Prickett
INVENTORS
BY Clarence A. O'Brien
and Harvey B. Jacobson
Attorneys Oct. 4, 1955 W. W. PRICKETT ET AL 2,719,480
DEEP FRIER
Filed Nov. 1, 1952 2 Sheets-Sheet 2

Wilbur W. Prickett
Mona E. Prickett
INVENTORS

United States Patent Office 2,719,480
Patented Oct. 4, 1955

2,719,480
DEEP FRIER

Wilber W. Prickett and Mona E. Prickett, San Diego, Calif.

Application November 4, 1952, Serial No. 318,722

3 Claims. (Cl. 99—426)

This invention relates to new and useful improvements in deep friers and the primary object of the present invention is to provide a device which is used for producing tortillas in a convenient manner.

Another important object of the present invention is to provide a deep frier including a base supporting a stationary mold and a support swingably mounted on the base and carrying a second mold that will move into an interdigitated position with the stationary mold, whereby a tortilla may be formed between the molds.

A further object of the present invention is to provide a deep frier of light, rigid inexpensive construction wherein the support is provided with a hand gripping portion capable of being gripped by one hand of a user for movement of the mold carried by the support into or out of interdigitated relation with the mold supported on the base.

A still further aim of the present invention is to provide a deep frier of the aforementioned character that may be readily and conveniently cleaned and handled and which may be placed in a grease filled vat.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the present invention;

Figure 2 is a side elevational view of the present invention;

Figure 3:
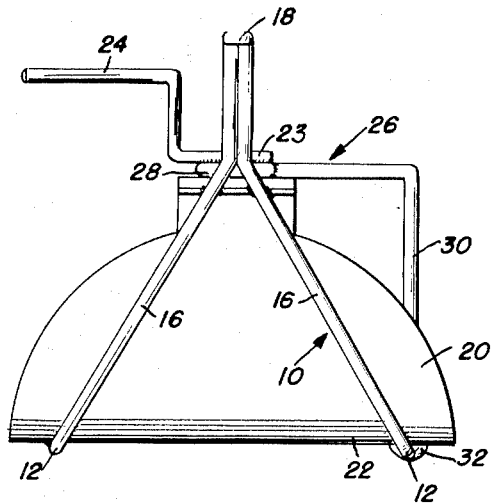
Figure 3 is an end view of Figure 2.
Figure 4:
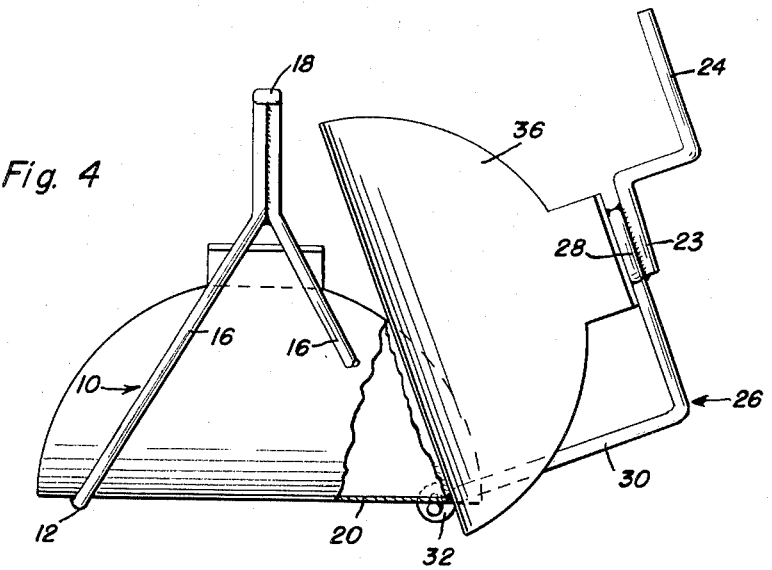
Figure 4 is a view similar to Figure 3 and showing the support swung to one side and with parts of the base and the stationary mold broken away.

Referring now to the drawings in detail, wherein for the purpose of illustration, there is disclosed a preferred embodiment of the present invention, the numeral 10 represents a base that is constructed from a length of wire and which includes a pair of parallel limbs 12 whose free ends are bent upwardly and then outwardly to form vertical hooks 14.

Limbs 12 are bent inwardly and upwardly intermediate their ends to form converging portions 16. The portions 16 are forced together and are then bent outwardly to form a hand gripping portion 18 that parallels the limbs 12.

An undulated stationary form 20 is provided with lower humps 22 that are fixed by welding or the like to the limbs 12. The ends of the form or mold 20 are fixed by welding or the like to the hooks 14 and the converging portions 16.

The offset end 23 of an L-shaped hand grip 24 is fixed by welding or the like to the central portion of an elongated substantially rectangular wire member 28 forming part of a support 26. The upper legs of a pair of rigid L-shaped arms 30 are fixedly secured to the wire member 28. The lower ends of the arms 30 are bent to form eyes 32 that are rotatably engaged about upwardly extending detents 34 pressed upwardly from one limb 12 of the base 10.

A movable undulated form or mold 36 is provided with upper humps 38 that are fixed to the wire member 28. The ends of the form 36 are also fixed to the wire member 28 so that the form 36 may be moved into interdigitated position with the form 20 as the support 26 is moved over the base 10.

In practical use of the present invention, the support 26 is swung outwardly so that tortilla forming ingredient may be placed in the mold 20 to be pressed into desired shape as the support 26 is swung over the base 10 with the mold 36 moving into interdigitated relationship with the mold 20. The device may be inserted into a grease filled vat (not shown) with the hooks 14 engaged over the peripheral wall of the vat and with the grip 18 resting upon a portion of said peripheral wall diametrically opposite from the hooks 14.

The base and support are constructed of light weight material that is readily cleaned and this is likewise true of the molds so that the entire device may be retained in a sanitary condition.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A deep frier comprising a base having an upstanding handle portion which extends from a pair of parallel lower limbs, a stationary undulated form fixed to the base, said form including upwardly opening portions for receiving material to be molded therein, a support including a pair of parallel arms terminating in eyes that are engaged over one of the parallel limbs to permit swinging movement of the support toward and away from the base, and a movable undulated form fixed to the support and movable into juxtaposition in the upwardly opening portions the stationary form as the support is moved toward the base.

2. A deep frier comprising a base having an upstanding handle portion which extends from a pair of parallel lower limbs, a stationary undulated form fixed to the base, said form including upwardly opening portions for receiving material to be molded therein a support including a pair of parallel arms terminating in eyes that are engaged over one of the parallel limbs to permit swinging movement of the support toward and away from the base, and a movable undulated form fixed to the support and movable into juxtaposition in the upwardly opening portions the stationary form as the support is moved toward the base, said one limb having a pair of upwardly extending detents that are engaged by said eyes to prevent sliding of the eyes longitudinally of said one limb.

3. A deep frier comprising a base constructed from a single length of wire and including a V-shaped portion having a pair of parallel limbs, upwardly extending hooks formed at the free ends of said limbs, said limbs being bent upwardly intermediate their ends to form a hand gripping portion, an undulated stationary mold having lower hump fixed to said limbs, an elongated wire member, a pair of L-shaped spaced parallel arms having upper ends fixed to said wire member, the lower ends of said arms terminating in eyes, a pair of upwardly extending detents formed in one limb of said base and engaged with said eyes, and a second undulated mold fixed to said wire member and movable therewith into juxtaposition with the first named mold as the eyes of said arms are swung on said detents.

References Cited in the file of this patent

UNITED STATES PATENTS

| 1,265,627 | Dickey | May 7, 1918 |
| 1,610,440 | Genna | Dec. 14, 1926 |
| 1,634,733 | Wills | July 5, 1927 |
| 2,503,795 | Brown | Apr. 11, 1950 |
| 2,570,374 | Pompa | Oct. 9, 1951 |